(No Model.)
J. TONEY.
HAY SLING.
No. 500,168. Patented June 27, 1893.
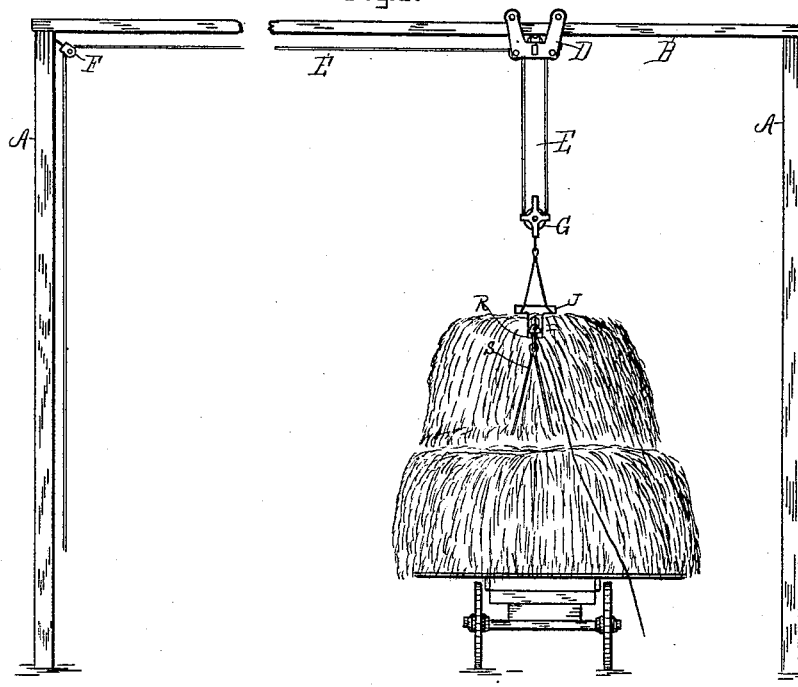
Fig. 1.
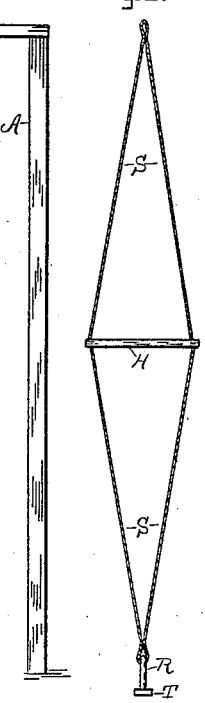
Fig. 2.
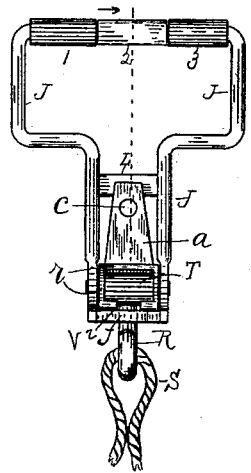
Fig. 3.
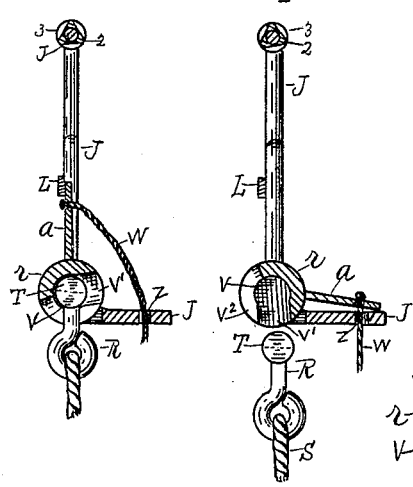
Fig. 4. Fig. 5.
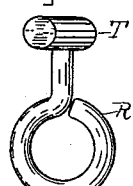
Fig. 6.
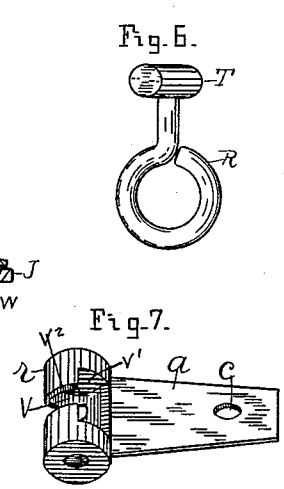
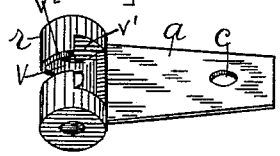
Fig. 7.
Witnesses:
Ray Hutchins.
Herbert Cowell
Inventor:
Jay Toney By
Thos. H. Hutchins his atty

UNITED STATES PATENT OFFICE.

JAY TONEY, OF MARSEILLES, ILLINOIS.

HAY-SLING.

SPECIFICATION forming part of Letters Patent No. 500,168, dated June 27, 1893.

Application filed March 9, 1893. Serial No. 465,247. (No model.)

*To all whom it may concern:*

Be it known that I, JAY TONEY, a citizen of the United States of America, residing at Marseilles, in the county of La Salle and State of Illinois, have invented certain new and useful Improvements in Hay-Slings, of which the following is a specification, reference being had therein to the accompanying drawings and the letters and figures of reference thereon, forming a part of this specification, in which—

Figure 1 is a view showing the sling applied to a load of hay and showing a frame and carrier for operating the sling. Fig. 2 is a perspective view of the hay sling. Fig. 3 is a side view of the trip latch showing it connected to a section of the sling. Fig. 4 is a section of Fig. 3 taken on line 1 looking in the direction of the arrow showing the sling attached to the trip latch. Fig. 5 is a section of Fig. 3 taken on line 1 looking in the direction of the arrow and showing the latch turned to release the sling. Fig. 6 is a perspective view of the T head on one end of the eye bolt of the sling, and Fig. 7 is a perspective view of the locking barrel of the trip latch.

This invention relates to certain improvements in hay slings, for unloading hay, which improvements are fully set forth and explained in the following specification and claims.

Referring to the drawings S represents the hay sling proper preferably made of rope and having one or more cross bars H for holding the two parts of the sling apart so as to cause it to support as large a quantity of hay as possible. It is intended to have several such slings and when the hay is being loaded on a wagon, to load these slings in with the hay, two or three in a load, so that each sling may be used to elevate and unload the hay that may be above it, commencing to unload with the upper sling as represented in Fig. 1. The sling S is provided at one end with an eye bolt R, having on its extending end a T head T as shown particularly in Fig. 6. The opposite end of the sling is intended to hook to the frame of the sheave wheel G, after passing through the frame J of the trip latch as shown in Fig. 1.

The trip latch consists of the frame J formed as shown in Fig. 3, and the barrel $r$, pivotally connected thereto as shown and having the integral arm $a$ for oscillating said barrel by means of a trip rope W, attached thereto by passing through its aperture C near its outer end. The cavity of said barrel is shown at V and is for the purpose of receiving the T head of the eye bolt R, said cavity being provided with the opening V' for admitting said T head, and the central annular opening $V^2$ for the reception of the shank of said eye bolt when said barrel is oscillated so as to lock the T head in the barrel.

L is a cross bar of frame J for use in preventing the arm $a$ from turning too far backward. Fig. 4 shows the T head of eye bolt R, locked in the cavity V of the barrel $r$, and Fig. 5 shows the barrel oscillated over forward by means of the arm $a$ and trip rope W so as to permit the T head T to pass out of the barrel through the opening V', so as to disconnect said two parts as shown in said Fig. 5. Said trip rope W passes through an aperture Z in the base of the frame J so as to guide it and hold it in proper position, and so it will bring arm $a$ down to the position shown in Fig. 5 to permit T head T to be released from barrel $r$.

In operation it is intended as before stated to load the sling S, or a number of such slings in the hay as it is being loaded on a wagon, in such manner that a quantity of hay will lie on each sling. When it is desired to unload the hay the wagon is brought under the sheave wheel G which is connected with a carriage D, above by means of the draft rope E. The carriage is of any ordinary pattern, and is intended to travel on the rail B supported on posts A, and is intended generally to be located in the ridge of a barn roof, and is intended to convey the hay from the wagon over a bay to be dropped by means of releasing the sling from it. The sheave G and its frame are then passed through the frame J under the friction sleeves 1, 2, 3 and hooked to one end of the sling as shown in Figs. 1 and 3. The latch and the opposite end of the sling are then brought together, and the T head T inserted in the barrel $r$ and locked therein by means of turning the arm $a$ up as shown in Fig. 4 so that said T head cannot escape until the trip rope W brings said arm down to the position shown in Fig. 5 so as to oscillate said barrel and permit the said T head to escape through the opening V'. A team or other power attached to the outer end of the draft rope E will cause the hay above the sling to be elevated by it until the frame of the sheave wheel G strikes the carriage D and causes it to travel toward the bay, and carry the sling load of hay from the wagon to the bay, when a pull on the trip rope W will turn the barrel $r$ to the position shown in Fig. 5 and permit the sling S to be released from the latch and let the hay fall, the sling however remaining hooked to the frame of sheave G to return it back to the load or wagon where it can be unhooked. Several slings may be used, and loaded in the hay as it is put on the wagon, so that a load of hay may be unloaded by means of one or more such operations in a few minutes. The roller 2 on the frame J of the latch is made triangular or fluted so that it will turn more readily when engaged by the frame of the sheave wheel G.

Having thus described my invention, what I claim as new, and desire to secure by Letters Patent, is as follows, to wit:

1. In a hay sling, the combination of the sling S, H, having the eye bolt R, provided with the T head T, and latch comprising the frame J having cross bar L, and aperture Z, oscillating barrel $r$, having the opening V, V' and $V^2$, and arm $a$ having aperture C and the trip rope W all arranged to operate substantially as and for the purpose set forth.

2. In a hay sling, a latch comprising the frame J I, the oscillating barrel $r$, having the central cavity V and openings V', $V^2$, leading thereto, and having the arm $a$; the trip rope W, attached to said arm and the T eye bolt R, for detachably connecting said sling and latch all combined and arranged to operate substantially as and for the purpose set forth.

3. The combination of the sling S, H, having the T head eye bolt R, sheave wheel G and its frame carriage D, draft rope E, supported track and latch comprising the frame J, L, and oscillating barrel $r$, having the cavity V and openings V', $V^2$ leading thereto, arm $a$ secured to said barrel and trip rope W attached to said arm, all arranged to operate substantially as and for the purpose set forth.

JAY TONEY.

Witnesses:
EDGAR L. WELLS,
AUGUST LEITERITZ.